United States Patent
Sikes et al.

(10) Patent No.: US 11,438,940 B2
(45) Date of Patent: Sep. 6, 2022

(54) SELECTIVELY ENABLING IDENTIFIER RESOURCES FOR CONNECTIONS IN A FIFTH GENERATION (5G) OR OTHER NEXT GENERATION WIRELESS NETWORK

(71) Applicants: AT&T Intellectual Property I, L.P., Atlanta, GA (US); AT&T Mobility II LLC, Atlanta, GA (US)

(72) Inventors: Jason Sikes, Carnation, WA (US); David Braunecker, Allen, TX (US); James Hamilton, Sammamish, WA (US); Ramesh Ayyagari, Alpharetta, GA (US); James Barksdale, III, Alpharetta, GA (US); Charles Balog, Marietta, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 139 days.

(21) Appl. No.: 16/854,350

(22) Filed: Apr. 21, 2020

(65) Prior Publication Data
US 2021/0329717 A1    Oct. 21, 2021

(51) Int. Cl.
*H04W 76/11* (2018.01)
*H04W 72/04* (2009.01)

(52) U.S. Cl.
CPC ............ *H04W 76/11* (2018.02); *H04W 72/04* (2013.01)

(58) Field of Classification Search
CPC .............................. H04W 76/11; H04W 72/04
See application file for complete search history.

(56) References Cited

U.S. PATENT DOCUMENTS

| | | | |
|---|---|---|---|
| 2014/0187242 A1* | 7/2014 | Zhang | H04W 8/18 455/435.2 |
| 2018/0131402 A1* | 5/2018 | He | H04B 1/3816 |
| 2018/0213078 A1* | 7/2018 | Visuri | H04W 8/205 |
| 2019/0149667 A1* | 5/2019 | Altman | H04W 8/183 726/7 |
| 2020/0021984 A1* | 1/2020 | Nagao | H04W 8/183 |
| 2021/0114616 A1* | 4/2021 | Altman | H04W 40/02 |

* cited by examiner

*Primary Examiner* — Brian D Nguyen
(74) *Attorney, Agent, or Firm* — Amin, Turocy & Watson, LLP

(57) ABSTRACT

Technologies described herein are generally directed to facilitating the allocation, scheduling, and management of network slice resources. According to some embodiments, a system can facilitate performance of operations. The operations can include facilitating receiving information regarding a characteristic of a potential connection, by a user device, to respective network devices of a group of provider networks. The operations can further include facilitating selecting an identifier resource from a group of identifier resources, the group comprising the identifier resources available to the user device for a connection to a corresponding network device of a provider network from the respective network devices of the group of provider networks, resulting in a selected identifier resource. Further, the operations can include communicating the selected identifier resource to the user device for use by the user device to establish the connection to the corresponding network device.

20 Claims, 10 Drawing Sheets

US 11,438,940 B2

SELECTIVELY ENABLING IDENTIFIER RESOURCES FOR CONNECTIONS IN A FIFTH GENERATION (5G) OR OTHER NEXT GENERATION WIRELESS NETWORK

TECHNICAL FIELD

The subject application is related to establishing connections in a fifth generation or other next generation wireless communication system, and, for example, using different identifier resources to establish network connections, such as embedded subscriber identity modules (eSIMs).

BACKGROUND

Fifth generation (5G) wireless communications can facilitate many different ways for user equipments (UEs) to establish connectivity with provider networks. Some conventional approaches use subscriber identity modules (SIMs) to identify a subscriber to a provider network, but these can inhibit the flexible use of different networks by subscribers. Even when multiple SIMs can be used, it can still be difficult to advantageously select between different networks for different circumstances.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
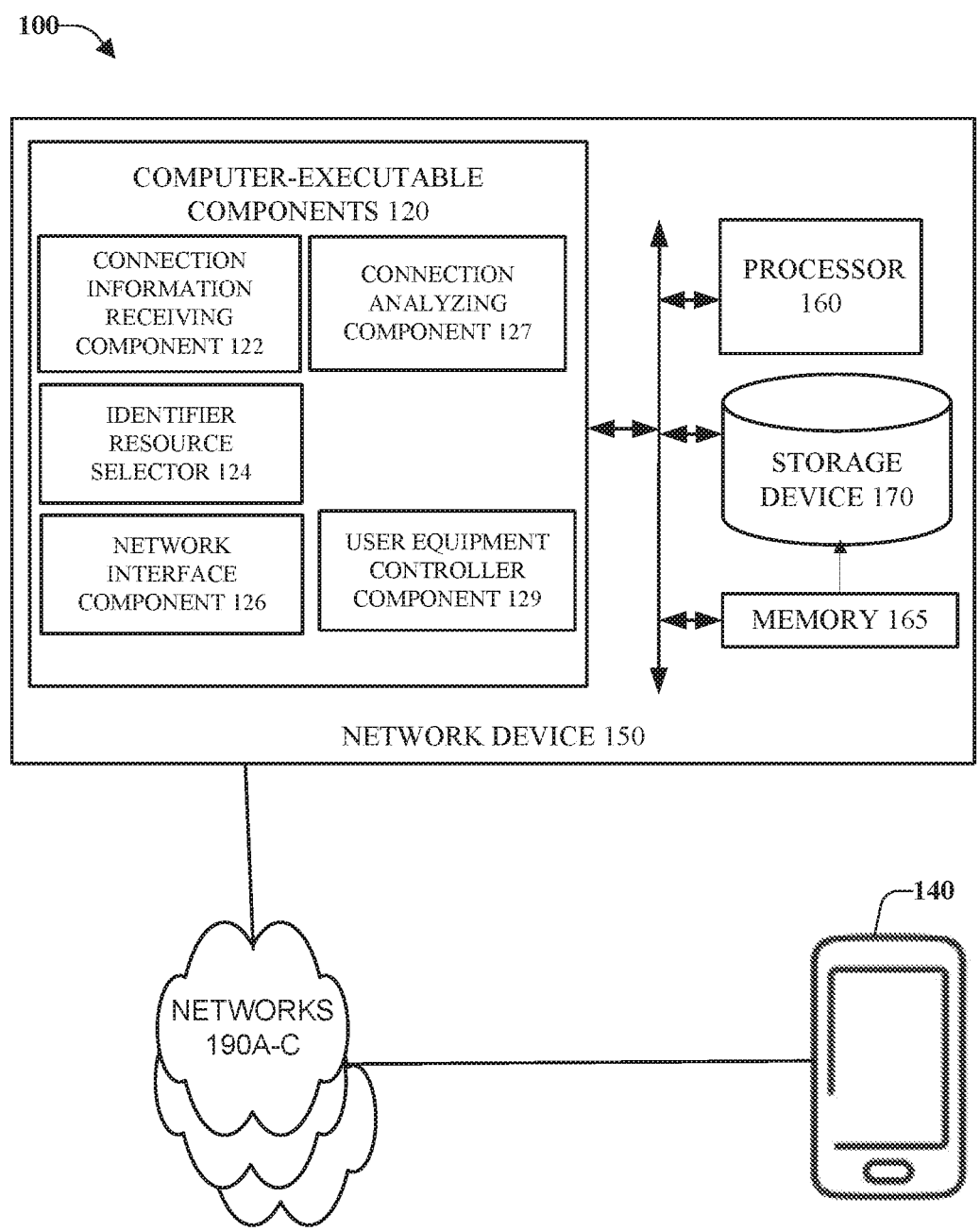
FIG. 1 is an architecture diagram of an example system that can facilitate selecting from multiple identifier resources to establish network connectivity with provider networks, in accordance with one or more embodiments.

Generally speaking, one or more embodiments described herein can facilitate establishing connectivity with different provider networks by advantageously selecting an eSIM from available eSIMs. In addition, one or more embodiments described herein can be directed towards a multi-connectivity framework that supports the operation of New Radio (NR, sometimes referred to as 5G). As will be understood, one or more embodiments can allow an integration of user devices with network assistance, by supporting control and mobility functionality on cellular links (e.g. long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS).

In some embodiments the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g. LTE.

Generally speaking, in one or more embodiments, a network device can provide network slicing with elements to support different types of services and requirements. The network slicing can also be termed virtual networking, and can provide virtual components that can distribute functionality for facilitating services to devices across the network, e.g., supporting multiple virtual networks behind interfaces of a communication network. The slicing of the network into multiple virtual networks can provide support for different Radio Access Networks (RAN) and different service types running across a single RAN. As discussed below, in one or more embodiments, flexible distribution of the access, edge, and core elements of the network cloud can provide support for latency and service isolation for different apps and service requirements.

FIG. 1 is an architecture diagram of an example system 100 that can facilitate selecting from multiple identifier resources to establish network connectivity with networks 190A-C, in accordance with one or more embodiments. For purposes of brevity, description of like elements and/or processes employed in other embodiments is omitted.

System 100 can include network device 150 communicatively coupled to user device 140 via one or more of networks 190A-C. According to multiple embodiments, network device 150 can include memory 165 that can store one or more computer and/or machine readable, writable, and/or executable components 120 and/or instructions that, when executed by processor 160, can facilitate performance of operations defined by the executable component(s) and/or instruction(s). Computer executable components 120 can include connection information receiving component 122, identifier resource selector component 124, network interface component 126, connection analyzing component 127, user equipment controller component 129, as well as other components to implement and provide functions to support system 100 and some other embodiments described herein.

It should be noted that, as used herein networks 190A-C refer to networks of different wireless communications service providers, also termed providers herein. Conventionally networks of different providers have required subscriber identity modules for identification and authentication so as to connect to different networks. In some implementations described herein, an identifier resource utilized can be a SIM card, e.g., an integrated circuit that can securely store an international mobile subscriber identity (IMSI) number with its related key. One or more embodiments described herein relate to the selection and use of an identifier resource variation of a SIM card such as an eSIM (also termed an embedded universal integrated circuit card (eUICC)). In some embodiments, a mobile device (e.g., user device 140) can have multiple eSIMs available to select from for connections. One having skill in the relevant art(s), given the description herein, would appreciate that the embodiments described herein can also be applied to other authentication approaches that can be used to access computing resources.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In an example, memory 165 can store computer and/or machine readable, writable, and/or executable components 120 and/or instructions that, when executed by processor 160, can facilitate execution of various functions described herein relating to network device 150 and other device, e.g., connection information receiving component 122, identifier resource selector component 124, network interface component 126, connection analyzing component 127, user equipment controller component 129, as well as other components to implement and provide functions to support system 100 and some other embodiments described herein.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Generally speaking, user device 140 can select identifier resources 245A-C to respectively establish connections with networks 190A-C. In an example described throughout this disclosure, based on different approaches described herein, for each connection established with a provider network (e.g., networks 190A-C), user device 140 selects, based on different criteria, a network to use for the connection. As described with FIGS. 3-6 below, different approaches, criteria, and resources can be used by one or more embodiments to select from available networks 190A-C for establishing connections.

Because, in this example, a connection to each network 190A-C requires use by user device 140 of an appropriate identity resource 245A-C. It should be appreciated that, in an alternative embodiments where identifier resources are not required for connection to networks 190A-C, one having skill in the art could still utilize many aspects of the present disclosure, these including, but not limited to, network selection criteria, sharing of network selection between user device 140 and network device 150, and different resources utilized by network device 150 and user device 140 to make network 190A-C selections.

As noted above, networks 190A-C are selected for the establishing of connections. One having skill in the relevant art(s), given the disclosure herein would appreciate that implementation details of different concepts described herein can vary the interval for which network selections can be used to establish connections, e.g., every connection, all connections in a day or other interval, all connections of a particular type (data, voice, to a particular type of device, to a particular geographical location, etc.). In additional embodiments, one or more embodiments can utilize two different eSIMs 245A-B to connect to two provider networks 190A-B respectively for two simultaneously occurring conditions. One should also note that different network selection approaches described herein could also be used to change provider networks during a session established by a single connection, e.g., voice call, data connection, etc.

Further to the examples described above, in one or more embodiments, memory 165 can store executable instructions that, when executed by processor 160, can facilitate generation of connection information receiving component 122 which can receive information regarding a characteristic of a potential connection, by a user device, to respective network devices of a group of provider networks. In an example embodiment, connection information receiving component 122 can facilitate network device 150 receiving information about which networks can be utilized by user device 140, e.g., whichever of three networks 190A-C are available (e.g., user device 140 has a subscriber relationship with respective providers and sufficient identifier resources to connect) then network device will evaluate the available networks for connection by user device 140.

Figure 4:
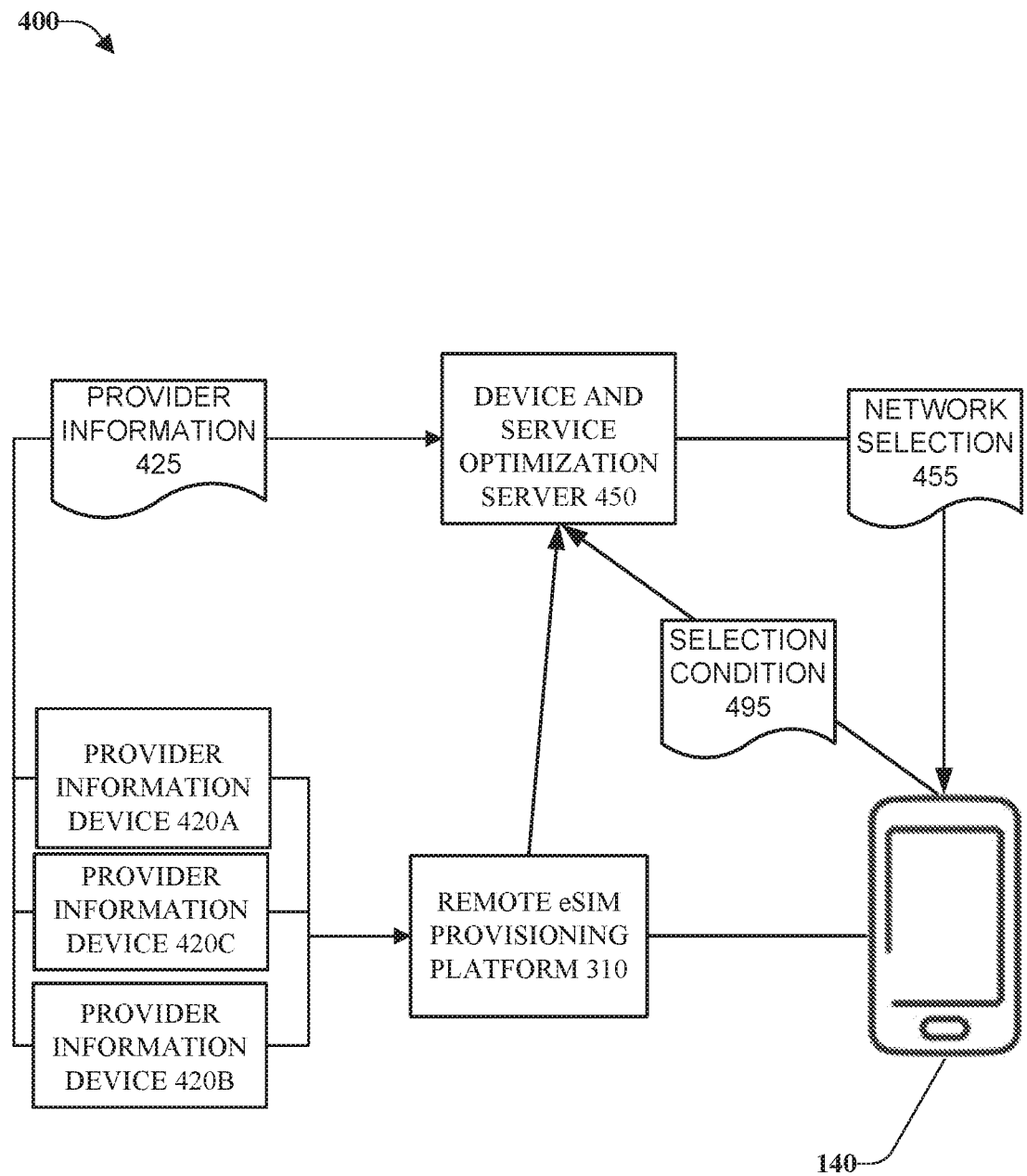
FIG. 4 is an architecture diagram of an example system that can facilitate utilizing provider information devices to select from multiple identifier resources to establish network connectivity with provider networks, in accordance with one or more embodiments.
Figure 5:
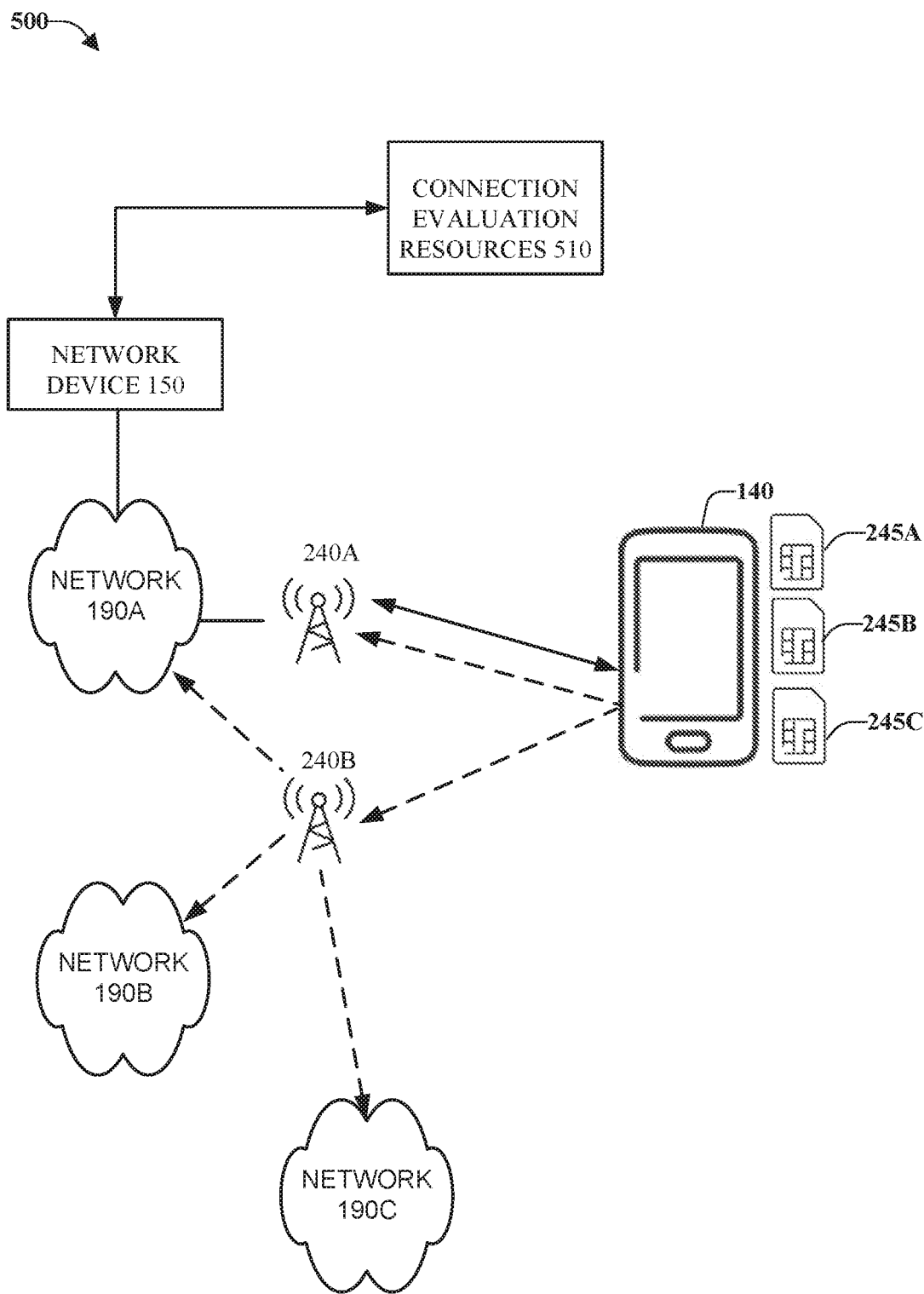
FIG. 5 is an architecture diagram of an example system that can facilitate utilizing connection evaluation resources 510 to select from multiple identifier resources to establish network connectivity with provider networks, in accordance with one or more embodiments.

To facilitate comparison and selection, connection information receiving component 122 can receive information regarding general characteristics about each network, as well as specific characteristics of a potential connection by user device 140 to each network 190A-C. FIGS. 4 and 5 below provide different sources of general and specific information about each network. e.g., in FIG. 4, specific information about a potential connection available to user device 140 during a relevant time period, and in FIG. 5 receiving of general information about each available network 190A-C is discussed.

Figure 2:
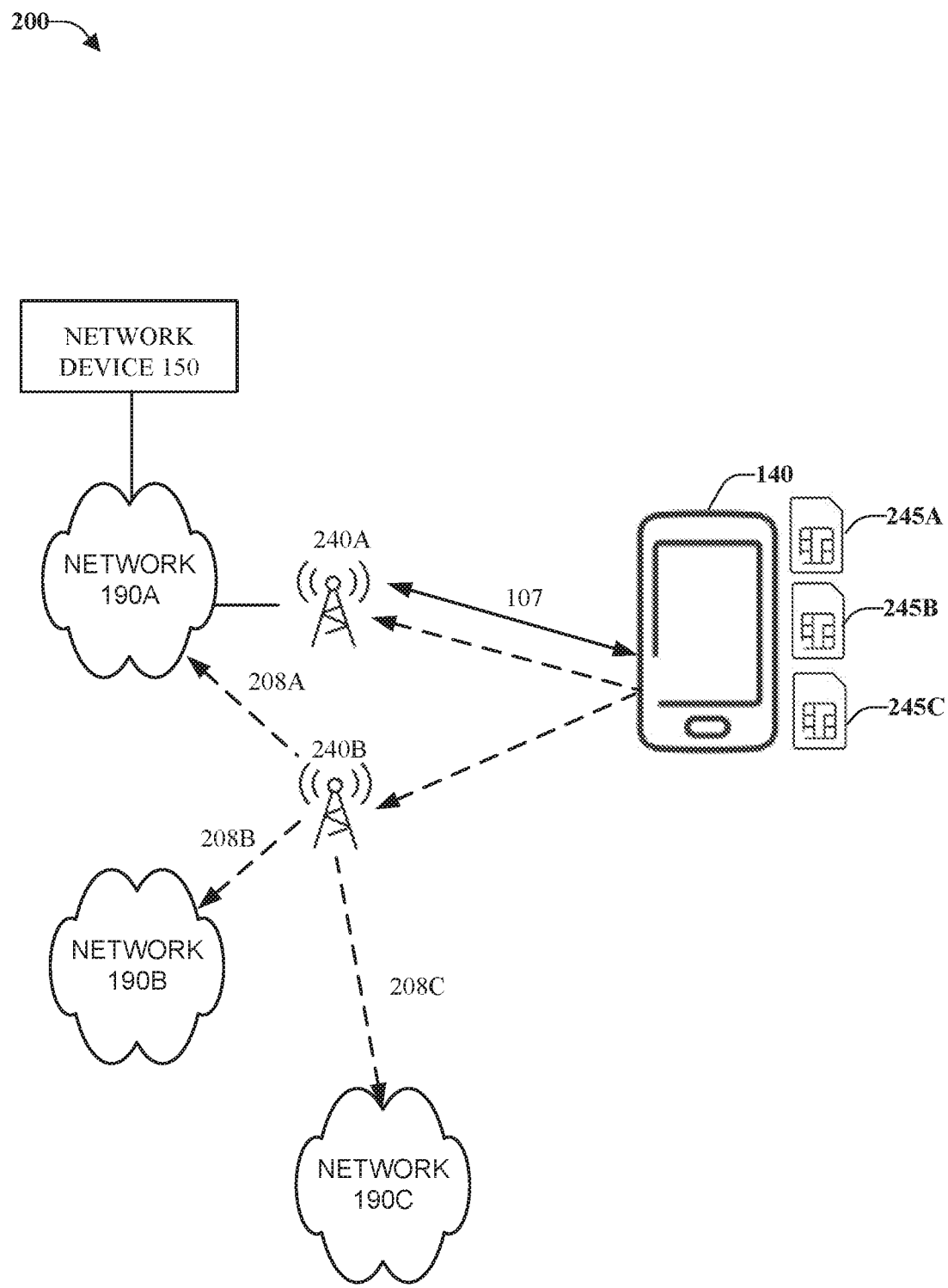
FIG. 2 is an architecture diagram of a non-limiting, example system that can facilitate selecting from multiple identifier resources to establish network connectivity with the provider networks, in accordance with one or more embodiments.

FIG. 2 is an architecture diagram of a non-limiting, example system 200 that can facilitate selecting from multiple identifier resources 245A-C to establish network connectivity with networks 190A-C, in accordance with one or more embodiments. For purposes of brevity, description of like elements and/or processes employed in other embodiments is omitted.

System 200 can include user device 140 communicatively coupled to networks 190A-C variously via radio network nodes 240A-B. It should be noted that networks 190B-C share radio network node 240B in an arrangement often termed colocation, e.g., tower colocation, wireless colocation, radio resource co-location, and other similar descriptive terms. Network 190A is further coupled to network device 150. User device 140 can utilize identifier resources 245A-C. It should be noted that although identifier resources 245A-C are depicted in FIG. 2 with symbols having a resemblance to conventional SIMs, this is for illustration purposes only and should not be construed as limiting. User device 140 can utilize identifier resources 245A-C.

Continuing the example from above, in one or more embodiments, memory 165 can store executable instructions that, when executed by processor 160, facilitate generation of identifier resource selector component 124, which can facilitate selecting an identifier resource from a group of identifier resources, the group comprising the identifier resources available to the user device for a connection to a corresponding network device of a provider network from the respective network devices of the group of provider networks, resulting in a selected identifier resource. In an example, based on available information, network device 150 can utilize identifier resource selector component 124 to evaluate available networks 190A-C and select an identifier resource 245A-C for a connection to the selected network.

In should be noted that, in different embodiments described herein, the selection of a network by network device 150 can be communicated to user device 140, where this selection can be a factor in a further selection by user device 140 of a network 190A-C to use for a connection. In an alternative embodiment, the selection of a network by network device 150 can be issued as an instruction to user device 140 such that no further evaluation is performed by user device 140. To implement this instruction, in one or more embodiments, memory 165 can store executable instructions that, when executed by processor 160, facilitate generation of user equipment controller component 129, which can issue an instruction to the user device 140 to establish the connection to the network device of the selected provider network 190A-C, e.g., in these embodiments, user device 140 is directed by network device 150 to establish a connection using a network selected by network device 150.

Figure 3:
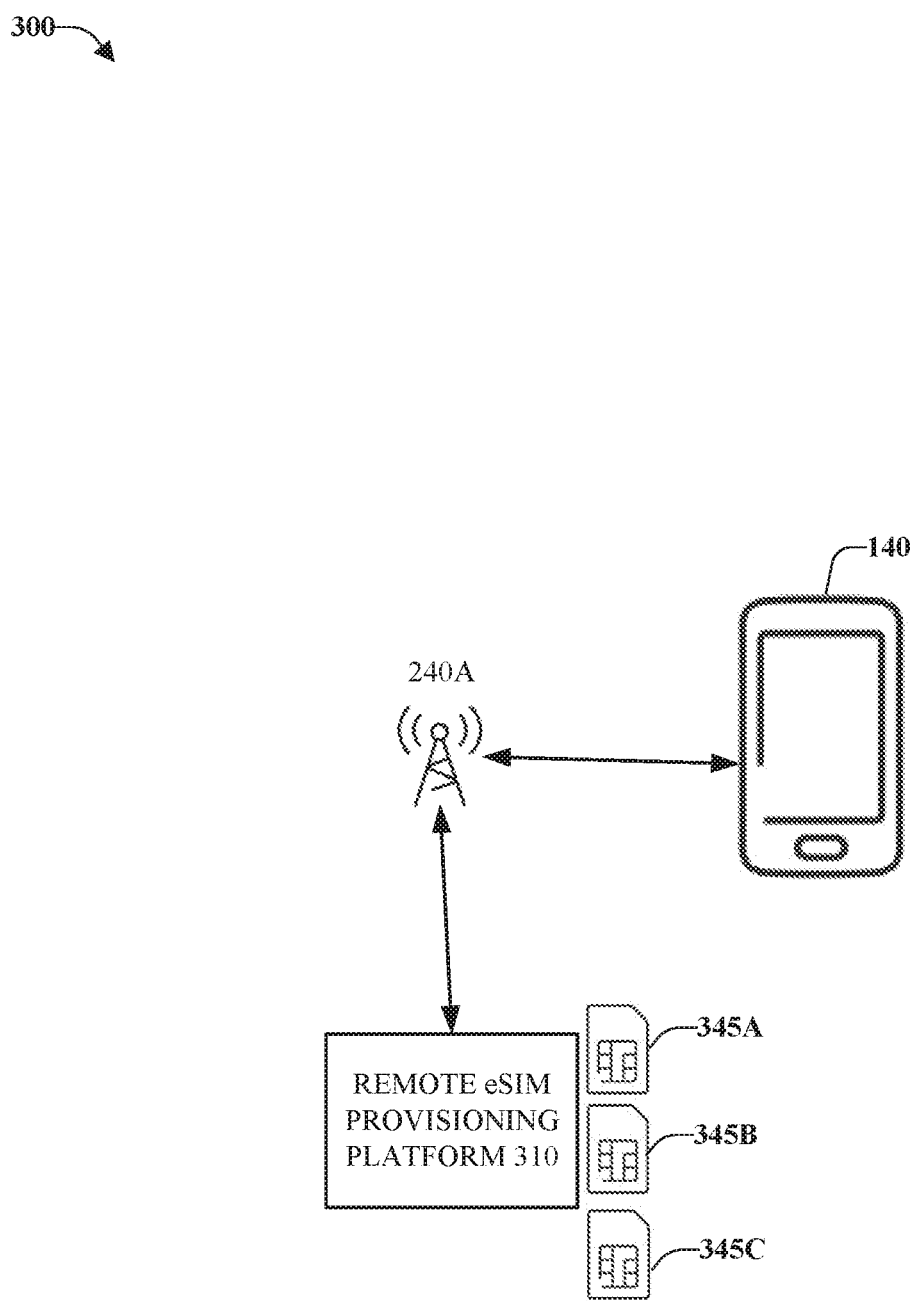
FIG. 3 is an architecture diagram of an example system that can facilitate utilizing remote eSIM provisioning platform to select from multiple available eSIMs to establish network connectivity with provider networks, in accordance with one or more embodiments.

FIG. 3 is an architecture diagram of an example system 300 that can facilitate utilizing remote eSIM provisioning platform 310 to select from multiple available eSIMs 345A-C to establish network connectivity with networks 190A-C, in accordance with one or more embodiments. System 300 can include user device 140 communicatively coupled to remote eSIM provisioning platform device 310 via radio network node 240A. Remote eSIM provisioning platform 310 can store and provide eSIMs 345A-C. For purposes of brevity, description of like elements and/or processes employed in other embodiments is omitted.

One or more embodiments can utilize identifier resources stored on a remote provisioning device, e.g., not in the user device, such as conventional SIMs. One approach to implementing this remote storage of identifier resources is to use a remote provisioning platform to store eSIMs, e.g., remote eSIM provisioning platform device 310 depicted as storing eSIMs 345A-C. In some implementations, remote eSIM provisioning platform device 310 can be termed a subscription manager data preparation platform server device (SM-DP+).

Based on platform device 310 storing eSIMs 345A-C, in an alternative implementation of connection information receiving component 122, instead of receiving information regarding networks available for connection by user device 140 from user device 140, this information regarding eSIMs available for use by user device 140. For example, in one or more embodiments, network device 150 can receive eSIM 345A-C information from platform device 310 regarding which networks 190A-C can be utilized by user device 140.

FIG. 4 is an architecture diagram of an example system 400 that can facilitate utilizing provider information devices 420A-C, providing provider information 425 to select from multiple identifier resources 245A-C to establish network connectivity with networks 190A-C, in accordance with one or more embodiments. For purposes of brevity, description of like elements and/or processes employed in other embodiments is omitted. System 400 can include user device 140 communicatively coupled to networks 190A-C variously via radio network nodes 240A-B (not shown). Provider information devices 420A-C are coupled to both device and service optimization server 450 and remote eSIM provisioning platform 310. User device 140 can provide selection condition 495 to, and receive network selection 455 from, device and service optimization server 450.

As noted with the discussion of FIG. 2 above, in one or more embodiments characteristics of networks 190A-C can be used to evaluate these networks for use by user device 140 for a particular connection. To facilitate comparison and selection of a network for user device 140, connection information receiving component 122 can receive information regarding general characteristics about each network, as well as specific characteristics of a potential connection by user device 140 to each network 190A-C. In one or more embodiments, provider information devices 420A-C can provide specific information about a potential connection available to user device 140 during a relevant time period.

Example information that can be provided by provider information devices 420A-C can includes but are not limited to prices for different services at particular times for user device 140, coverage information for aspects of relate networks 420A-C, and discounts and promotions that can be offered to user device 140 at different times for different services. Example output that can be generated by device and service optimization server 450 include information or provisioning identifier resources 245A-C by remote eSIM provisioning platform 310.

In an example based on the foregoing, user device 140 can be established as a subscriber of networks 190A-C. To facilitate the authentication of these subscriptions, provider information devices 420A-C can provide identifier resources 245A-C respectively to remote eSIM provisioning platform 310. When user device 140 initially connected, remote eSIM provisioning platform 310 can be contacted and identifier resource 245A-C can be provisioned from remote eSIM provisioning platform and stored at user device 140 for use establishing connections. In an alternative embodiment, user device 140 can remotely access remote eSIM provisioning platform 310, e.g., to get identifier information for establishing connections.

In one or more embodiments, to prepare for selecting from networks 190A-C for user device 140, device and service optimization server 450 device and service optimization server can query provider information devices 420A-C for information about these networks 190A-C connections to user device 150. In this example, each of the networks 190A-C can communicate to device and service optimization server 450 that user device 140 is a subscriber of the networks 190A-C, as well as service conditions of their subscription.

After the example setup actions described above, to establish a connection via one of networks 420A-C, user device 140 can receive available network information from remote eSIM provisioning platform 310, e.g., that networks 420A-C are available for connections. In different implementations, remote eSIM provisioning platform 310, can notify device and service optimization server 450 that user device requires a selection between available networks 190A-C. Alternatively, user device 140 can, as a part of establishing a connection, request a network selection between networks 190A-C.

Continuing this example, in some embodiments, provider information 425 is provided by one or more provider information devices 420A-C, e.g., subscription information about user device 140. This information can be combined by device and service optimization server 450 with other specific information about user device 140. In addition, as discussed with FIG. 5 below, one or more embodiments can utilize the information discussed above as well as public information about the available networks 190A-C. As detailed in FIG. 6 below, additional information can be provided by user device 140 to facilitate the selection by device and service optimization server 450 of one or more of networks 190A-C.

FIG. 5 is an architecture diagram of an example system 500 that can facilitate utilizing connection evaluation resources 510 to select from multiple identifier resources 245A-C to establish network connectivity with networks 190A-C, in accordance with one or more embodiments. For purposes of brevity, description of like elements and/or processes employed in other embodiments is omitted. System 500 can include user device 140 communicatively coupled to networks 190A-C variously via radio network nodes 240A-B. Network 190A is further coupled to connection evaluation resources 510 via network device 150.

As noted above, one or more embodiments can combine and evaluate data from multiple sources. In an example of private data discussed with FIG. 4 above, provider information devices 420A-C can provide information specific to user device 140. In one or more embodiments, connection evaluation resources 510 represents a variety of different types of data that can be used by device and service optimization server 450 to select from available networks 190A-C. In one or more embodiments, the variety of different types of data can include, but are not limited to, speed test results, latency performance, low latency measured by applications and services that have used the available networks 190A-C and can provide additional, relevant information, public rating of network paths, quality benchmarks performed by different user devices, as well as other information from the wireless industry. In some embodiments, this information can be collected by device and service optimization server 450, e.g., by quality of service metrics collected.

Figure 6:
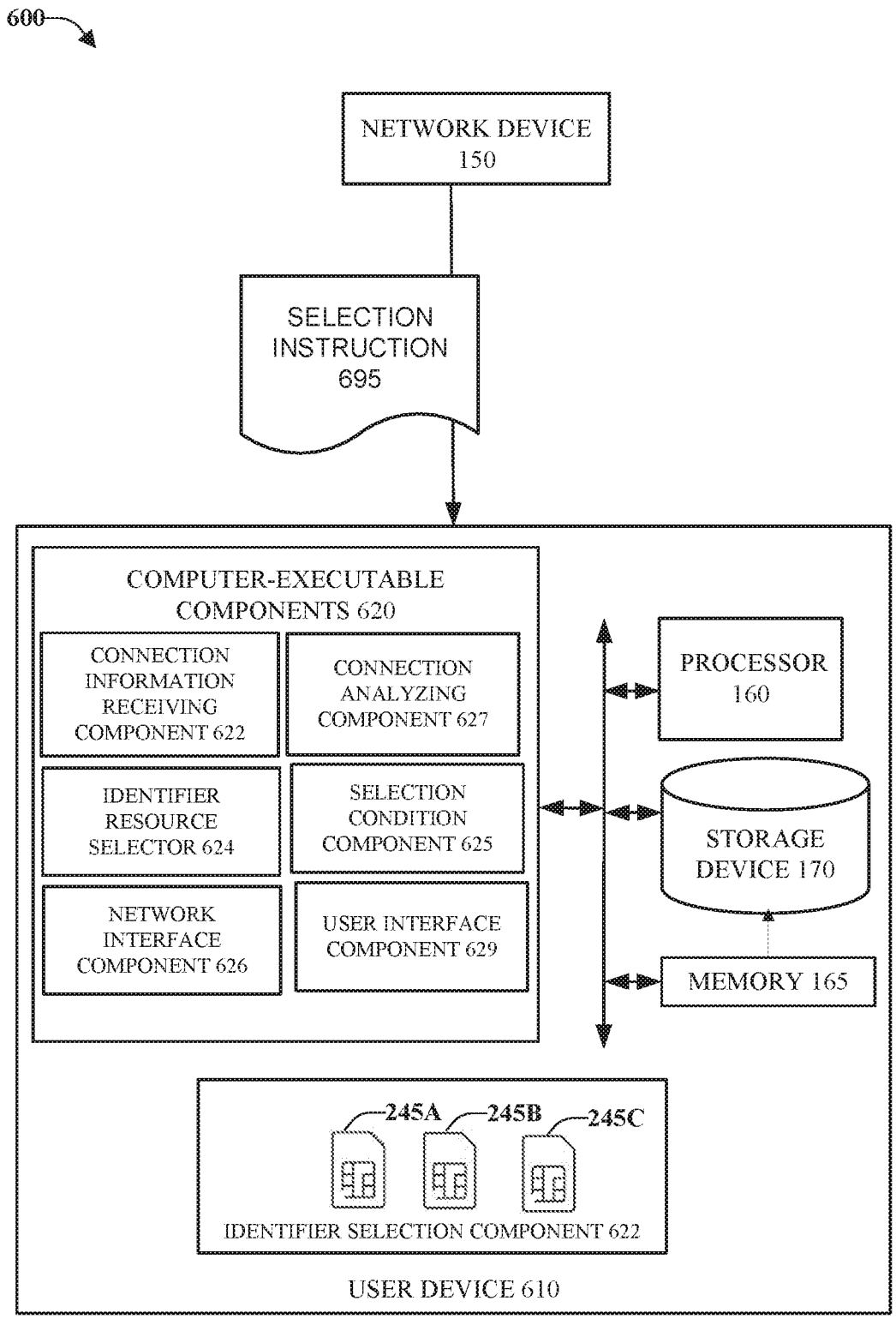
FIG. 6 is an architecture diagram of an example system that can enable a user device to select from multiple identifier resources to establish network connectivity with provider networks, in accordance with one or more embodiments.

FIG. 6 is an architecture diagram of an example system 600 that can enable user device 610 to select from multiple identifier resources 245A-C to establish network connectivity with networks 190A-C, in accordance with one or more embodiments. For purposes of brevity, description of like elements and/or processes employed in other embodiments is omitted.

System 600 can include user device 610 communicatively coupled to network device 150. As described further below, user device 610 can generate and communicate selection condition 650, e.g., to be utilized by network device 150. According to multiple embodiments, user device 610 can include memory 165 that can store one or more computer and/or machine readable, writable, and/or executable components 620 and/or instructions that, when executed by processor 160, can facilitate performance of operations defined by the executable component(s) and/or instruction(s). Computer executable components 120 can include connection information receiving component 622, identifier resource selector component 624, network interface component 626, connection analyzing component 627, selection condition component 625, user interface component 629, as well as other components to implement and provide functions to support system 600 and some other embodiments described herein.

In one or more embodiments, memory 165 can store executable instructions that, when executed by processor 160, can facilitate, by user device 610 comprising a processor 160, receiving, from a network device 150, a communication that comprises an indication (e.g., network selection 455) corresponding to a subscriber identity module e.g., identifier resource selected by the network device from a group of subscriber identity modules, the group comprising the subscriber identity modules 345A-C available for use to connect user devices to network devices respectively corresponding to different provider networks 190A-C. As would be appreciated by one having skill in the relevant art(s), given the disclosure herein, this description describes aspects of the embodiments discussed with FIG. 1, but from the perspective of user device 140, e.g., receiving the network selection from network device 150.

In one or more embodiments, memory 165 can store executable instructions that, when executed by processor 160, can analyze, (by connection analyzing component 626 of user device 140), a characteristic of a network device, of the network devices, of a provider network 190A corresponding to resource identifier 245A, wherein the communication further comprises information corresponding to the characteristic of the network device of the provider network. In one or more embodiments discussed below, characteristics of potential connections with networks 190A-C can be also evaluated.

In one or more embodiments, memory 165 can store executable instructions that, when executed by processor 160, can, based on the indication from the network device and a result of the analyzing the characteristic of the provider network, select, by the user device, the network device of the provider network, resulting in a selected network device of a selected provider, and a selected corresponding subscriber identity module.

The machine-readable storage medium of claim 17, wherein the identifying the information regarding the characteristic of the potential connections, by the user device, to the network devices of the provider networks comprises receiving the information regarding the characteristic from the user device.

In another aspect, one or more embodiments, memory 165 can store executable instructions that, when executed by processor 160, facilitate generation of connection analyzing component which can receive a selection condition from the user device, and wherein the selecting the identifier resource is based on the selection condition. In an example implementation, a user interface facilitates the collection of preference information for the selection among networks 190A-C. In this example, the user interface collects a preference for a low latency connection (e.g., public speed tests) and a low price, e.g., as determined by each provider network. Based on this collected information, selection condition 495 can be generated and communicated to device and service optimization server 450.

In an example with additional details, the selection condition generated by user device 140 can be a lowest connection cost condition, that is, the provider network comprises a connection cost characteristic of the provider network, with the different provider networks evaluated by the provider network based on the selection condition. In additional embodiments, selection condition 495 can include comprises a connection cost condition, wherein the characteristic of the potential connection comprises a connection cost characteristic of the potential connection, and wherein the selecting the identifier resource based on the selection condition comprises selecting the identifier resource corresponding to the network device of the provider network that is determined to be able to provide the connection with the connection cost characteristic that satisfies the connection cost condition.

In another example, selection condition 495 can comprise a connection bandwidth condition, with the example characteristic of the potential connection comprising a connection bandwidth characteristic of the connection, and wherein the selecting the identifier resource based on the selection condition comprises selecting the identifier resource corresponding to the network device of the provider network that is determined to be able to provide the connection with the connection bandwidth characteristic that satisfies the connection bandwidth condition.

Figure 7:
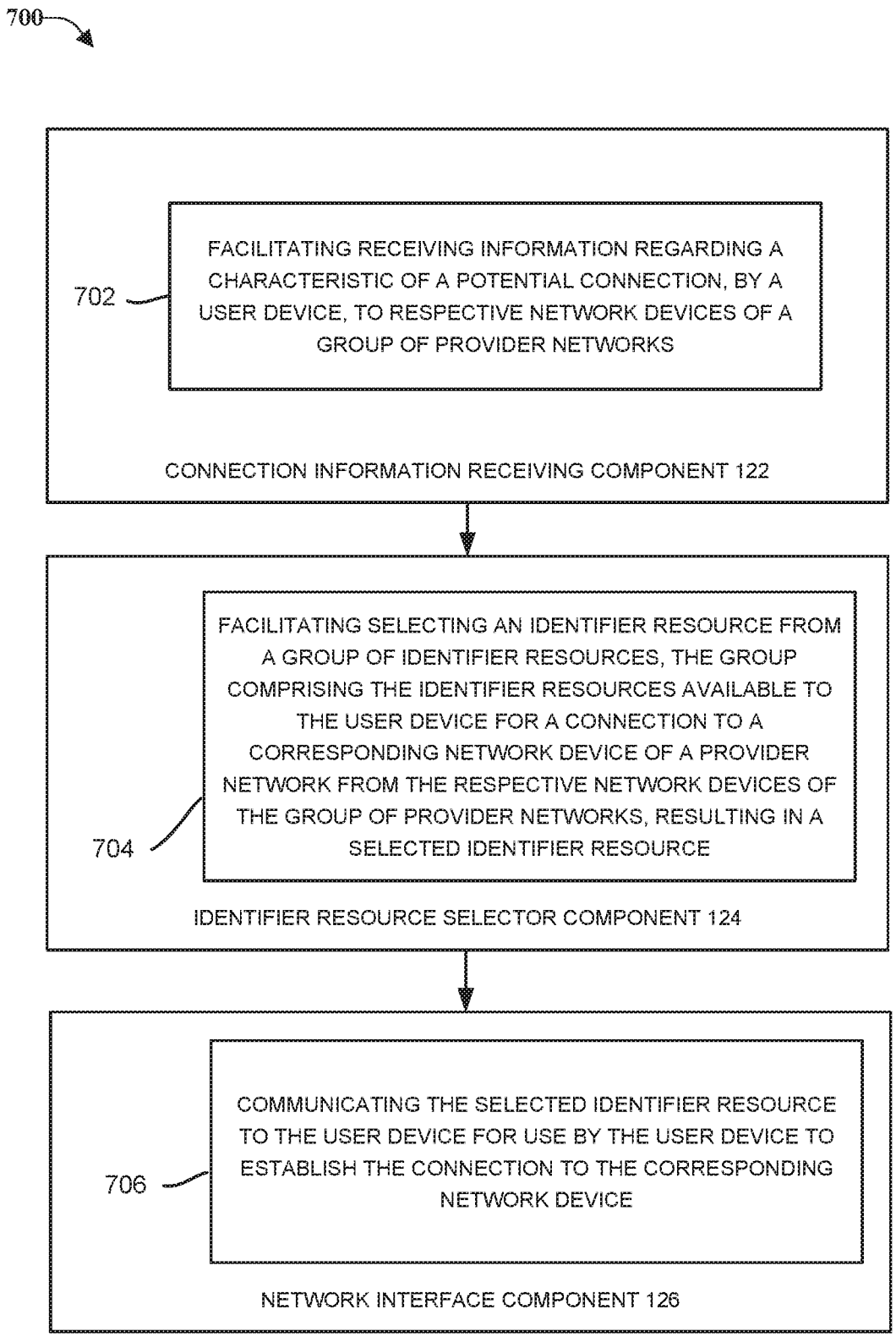
FIG. 7 illustrates an implementation of an example, non-limiting system that can comprise connection information receiving component, identifier resource selector component, network interface component, connection analyzing component, user equipment controller component, as well as other components to implement and provide functions to support system and some other embodiments described herein, in accordance with one or more embodiments.

FIG. 7 illustrates an implementation of an example, non-limiting system 700 that can comprise connection information receiving component 122, identifier resource selector component 124, network interface component 126, connection analyzing component 127, user equipment controller component 129, as well as other components to implement and provide functions to support system 700 and some other embodiments described herein, in accordance with one or more embodiments. Repetitive description of like elements and/or processes employed in respective embodiments is omitted for sake of brevity.

In one or more embodiments, connection information receiving component 122 can be configured 702 to facilitate receiving information regarding a characteristic of a potential connection, by a user device, to respective network devices of a group of provider networks. For example, in one or more embodiments, connection information receiving component 122 can be configured 702 to facilitate receiving information regarding a characteristic of a potential connection, by a user device 140, to respective network devices of a group of provider networks 190A-C.

In one or more embodiments, identifier resource selector component 124 can be configured 704 to facilitate selecting an identifier resource from a group of identifier resources, the group comprising the identifier resources available to the user device for a connection to a corresponding network device of a provider network from the respective network devices of the group of provider networks, resulting in a selected identifier resource. For example, in one or more embodiments, identifier resource selector component 124 can be configured 704 to facilitate selecting an identifier resource from a group of identifier resources, the group comprising the identifier resources 245A-C available to the user device 140 for a connection to a corresponding network device of a provider network from the respective network devices of the group of provider networks, resulting in a selected identifier resource.

In one or more embodiments, identifier resource selector component 124 can be configured 706 to facilitate communicating the selected identifier resource to the user device for use by the user device to establish the connection to the corresponding network device. For example, in one or more embodiments, identifier resource selector component 124 can be configured 706 to facilitate communicating the selected identifier resource to the user device for use by the user device to establish the connection to the corresponding network device.

Figure 8:
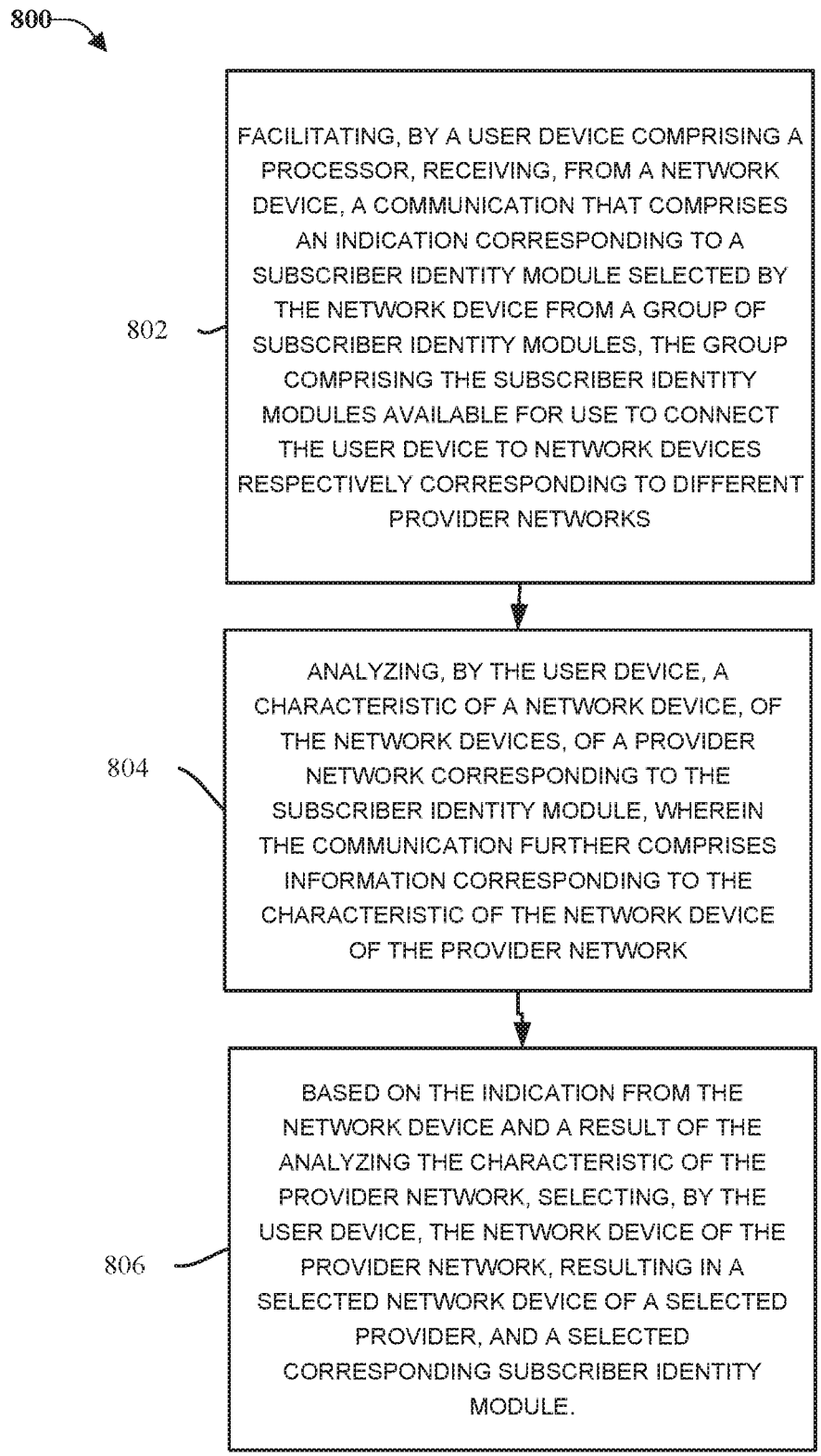
FIG. 8 illustrates a flow diagram of an example method that can facilitate selecting from multiple SIMs to establish network connectivity with provider networks, in accordance with one or more embodiments.

FIG. 8 illustrates a flow diagram of an example method 800 that can facilitate selecting from multiple SIMs to establish network connectivity with networks 190A-C, in accordance with one or more embodiments. For purposes of brevity, description of like elements and/or processes employed in other embodiments is omitted.

At 802, method 800 can comprise facilitating, by a user device comprising a processor, receiving, from a network device, a communication that comprises an indication corresponding to a subscriber identity module selected by the network device from a group of subscriber identity modules, the group comprising the subscriber identity modules available for use to connect the user device to network devices respectively corresponding to different provider networks. For example, in one or more embodiments, method 800 can comprise facilitating, by a user device comprising a processor, receiving, from a network device, a communication that comprises an indication corresponding to a subscriber identity module selected by the network device from a group of subscriber identity modules, the group comprising the subscriber identity modules available for use to connect the user device to network devices respectively corresponding to different provider networks.

At 804, method 800 can comprise facilitating, by a user device comprising a processor, receiving, from a network device, a communication that comprises an indication corresponding to a subscriber identity module selected by the network device from a group of subscriber identity modules, the group comprising the subscriber identity modules available for use to connect the user device to network devices respectively corresponding to different provider networks. For example, in one or more embodiments, method 800 can comprise facilitating, by user device 140 comprising processor 160, receiving, from a network device, a communication that comprises an indication corresponding to a subscriber identity module selected by the network device from a group of subscriber identity modules, the group comprising the subscriber identity modules available for use to connect the user device to network devices respectively corresponding to different provider networks.

At 806, method 800 can comprise analyzing, by the user device, a characteristic of a network device, of the network devices, of a provider network corresponding to the subscriber identity module, wherein the communication further comprises information corresponding to the characteristic of the network device of the provider network. For example, in one or more embodiments, method 800 can comprise analyzing, by the user device, a characteristic of a network device, of the network devices, of provider networks 190A-C corresponding to the subscriber identity module, wherein the communication further comprises information corresponding to the characteristic of the network device of the provider network.

At 808, method 800 can comprise based on the indication from the network device and a result of the analyzing the characteristic of the provider network, selecting, by the user device, the network device of the provider network, resulting in a selected network device of a selected provider, and a selected corresponding subscriber identity module. For example, in one or more embodiments, method 800 can comprise based on the indication from the network device 150 and a result of the analyzing the characteristic of the provider networks 190A-C, selecting, by the user device, the network device of the provider network, resulting in a selected network device of a selected provider, and a selected corresponding subscriber identity module.

It is to be appreciated that one or more embodiments described herein can utilize various combinations of electrical components, mechanical components, mass storage, circuitry, and extensive, repetitive, rapidly performed, and complicated analysis of data that cannot be replicated in the mind of a human or performed by any number of humans working together. One or more embodiments can provide a technical solution to a technical problem by processing and analyzing utilization data of network slices with functions beyond the capability of a human mind, e.g., the operations of network components including, but not limited to, collecting data and evaluating provider networks for each connection established in a combined cannot be performed by a human mind in the period of time required by one or more embodiments.

According to several embodiments, systems discussed with FIGS. 1-6 can also be fully operational towards performing one or more other functions (e.g., fully powered on, fully executed, etc.) while also performing the various operations of a RAN that are described and suggested herein. It should be appreciated that such simultaneous multi-operational execution is beyond the capability of a human mind. It should also be appreciated that systems of FIGS. 1-6 can obtain, analyze, and process information that is impossible to obtain, analyze, and process manually by an entity, such as a human user. For example, the type, amount, and/or variety of information utilized and generated by the systems of FIGS. 1-6 disclosed herein, can be more complex than information able to be obtained manually by a human user.

Figure 9:
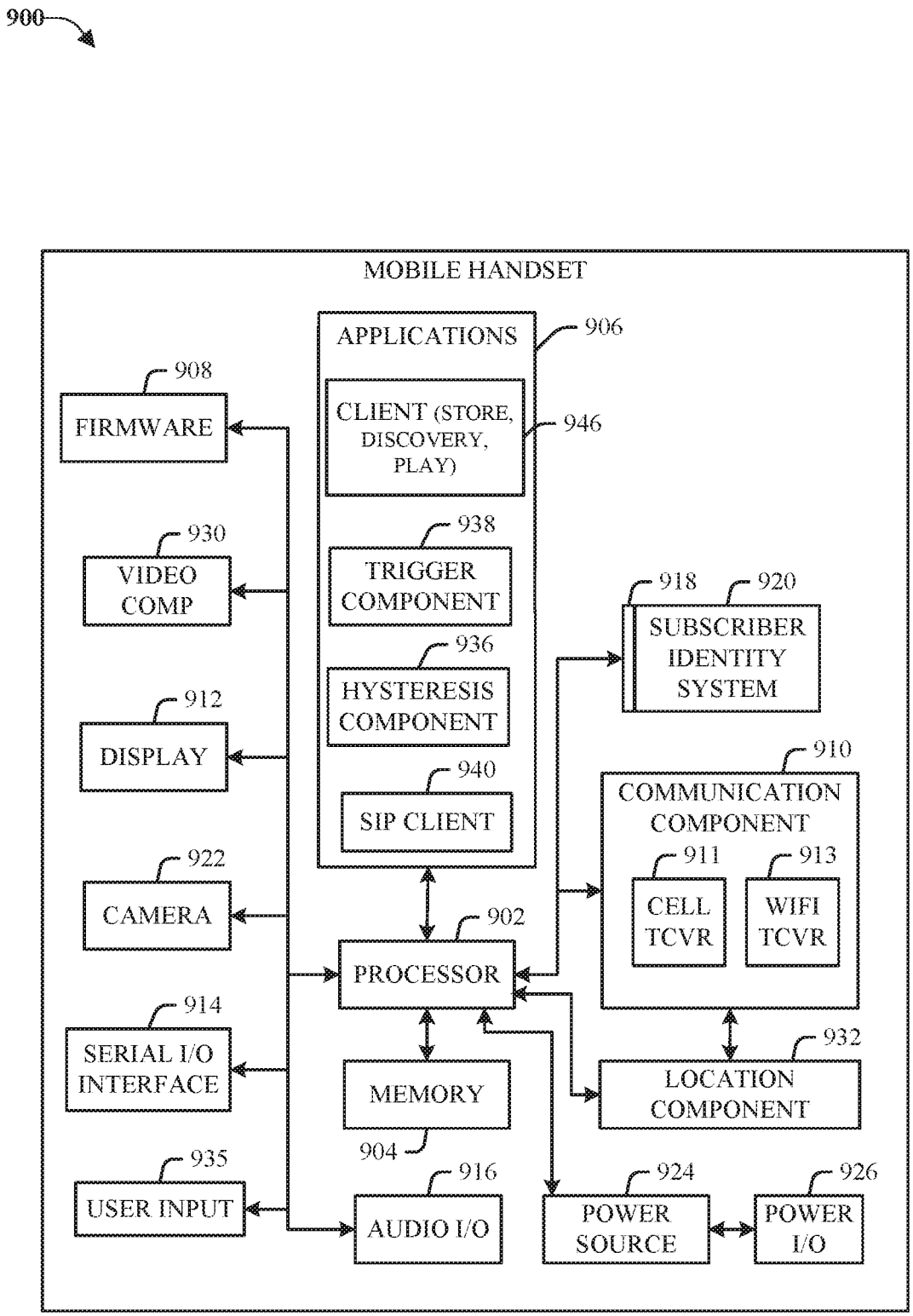
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As discussed with FIG. 1, network 190A-C can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device 150 can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

Networks 190A-C can employ various cellular systems, technologies, and modulation schemes to facilitate wireless radio communications between devices (e.g., user device 140 and network device 150). While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the user device 140 and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
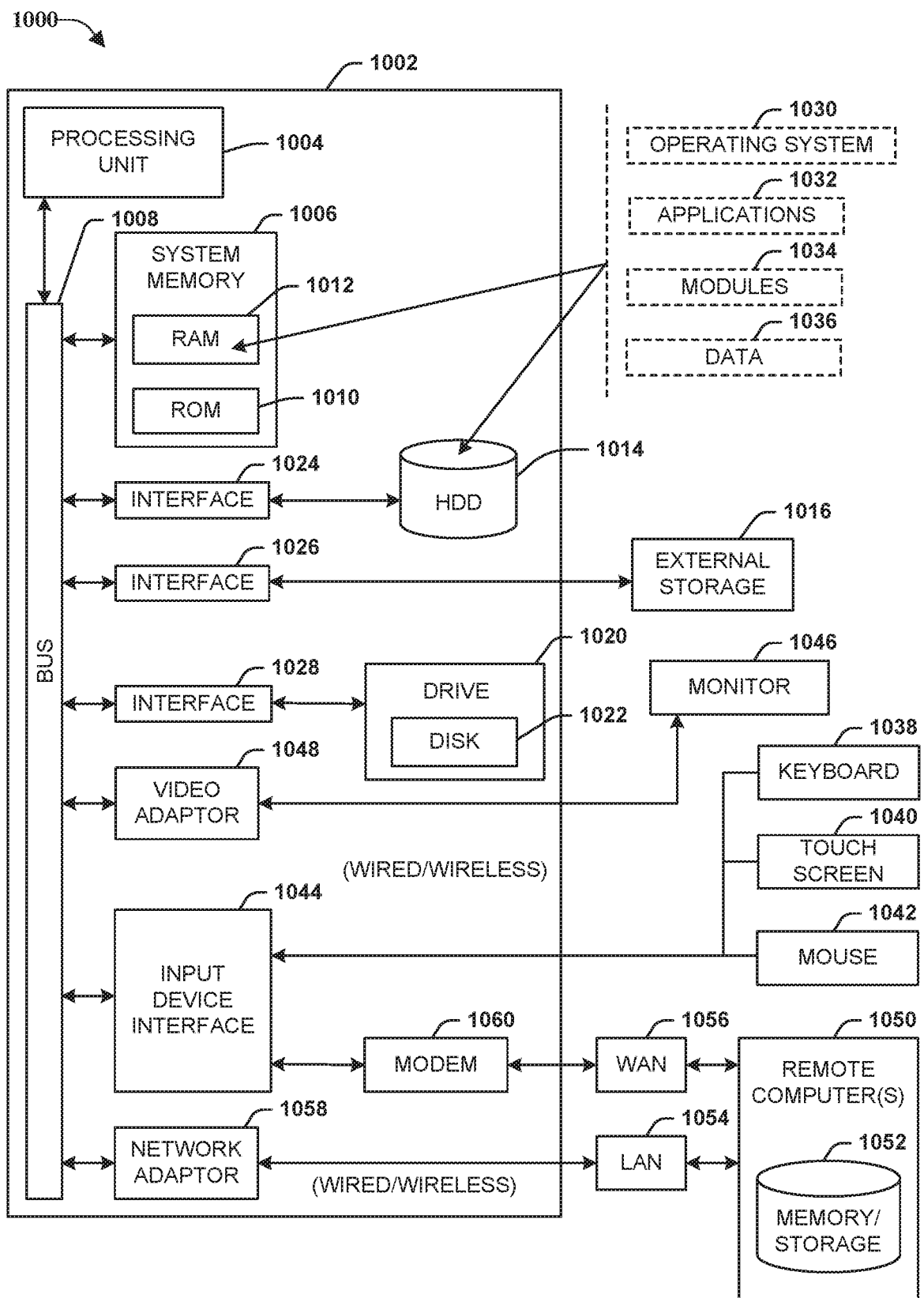
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR)

remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory"

or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. Network equipment, comprising:
    a processor; and
    a memory that stores executable instructions that, when executed by the processor, facilitate performance of operations, comprising:
        receiving information regarding a characteristic of a potential connection, by a user equipment, to respective network equipment of a group of provider networks maintained by network providing entities, wherein receiving the information regarding the characteristic of the potential connection comprises retrieving a current network cost characteristic from an information device maintained by respective provider networks,
        based on the information, selecting an identifier resource from a group of identifier resources, the group comprising the identifier resources available to the user equipment for a connection to a corresponding network equipment of a provider network from the respective network equipment of the group of provider networks, resulting in a selected identifier resource, and
        communicating the selected identifier resource to the user equipment for use by the user equipment to establish the connection to the corresponding network equipment.

2. The network equipment of claim 1, wherein the operations further comprise receiving a selection condition from the user equipment, and wherein selecting the identifier resource is based on the selection condition.

3. The network equipment of claim 2, wherein the selection condition comprises a condition identified based on input collected via a user interface of the user equipment.

4. The network equipment of claim 2, wherein the selection condition comprises a connection cost condition, wherein the characteristic of the potential connection comprises a connection cost characteristic of the potential connection, and wherein selecting the identifier resource based on the selection condition comprises selecting the identifier resource corresponding to the network equipment of the provider network that is determined to be able to provide the connection with the connection cost characteristic that satisfies the connection cost condition.

5. The network equipment of claim 4, wherein the connection cost condition comprises a lowest connection cost condition.

6. The network equipment of claim 2, wherein the selection condition comprises a connection bandwidth condition, wherein the characteristic of the potential connection comprises a connection bandwidth characteristic of the connection, and wherein selecting the identifier resource based on the selection condition comprises selecting the identifier resource corresponding to the network equipment of the provider network that is determined to be able to provide the connection with the connection bandwidth characteristic that satisfies the connection bandwidth condition.

7. The network equipment of claim 6, wherein the connection bandwidth condition comprises a highest connection bandwidth condition.

8. The network equipment of claim 1, wherein the identifier resource comprises an electronic subscriber network authenticator for use to connect the user equipment to network devices respectively corresponding to different provider networks.

9. The network equipment of claim 1, wherein selecting the identifier resource from the group of identifier resources is performed on a per session basis.

10. A method, comprising:
    facilitating, by a user device comprising a processor, receiving, from a network device, a communication that comprises an indication corresponding to a subscriber authenticator selected by the network device from a group of subscriber authenticators, the group comprising the subscriber authenticators available for use to connect the user device to network devices respectively corresponding to different provider networks maintained by network providers, wherein the communication was generated by the network device based on a current network cost retrieved by the network device from respective provider information sources,
    analyzing, by the user device, a characteristic of a network device, of the network devices, of a provider network corresponding to the subscriber authenticator, wherein the communication further comprises information corresponding to the characteristic of the network device of the provider network; and
    based on the indication from the network device and a result of the analyzing the characteristic of the provider network, selecting, by the user device, the network device of the provider network, resulting in a selected network device of a selected provider, and a selected corresponding subscriber authenticator.

11. The method of claim 10, further comprising identifying, by the user device, a selection condition for use by the network device to select the subscriber authenticator corresponding to the provider network, wherein the selection condition is for an evaluation of the network devices of the different provider networks, by the network device, to facilitate selection of the subscriber authenticator by the network device.

12. The method of claim 11, wherein the selection condition comprises a connection cost condition, wherein the characteristic of the provider network comprises a connection cost characteristic of the provider network, and wherein the different provider networks evaluated the provider network based on the selection condition.

13. The method of claim 11, wherein identifying the selection condition comprises identifying the selection condition based on input collected via a user interface of the user device.

14. The method of claim 10, further comprising:
identifying, by the user device, the group of subscriber authenticators available for use to connect to the network devices of the different provider networks, resulting in an identified group; and
communicating, by the user device, the identified group and network information representative of the network devices of the different provider networks to the network device for use in selection of the subscriber authenticators from the identified group.

15. The method of claim 10, wherein the subscriber authenticator is a first subscriber authenticator, wherein the network device is a first network device of a first provider network, and wherein selecting the network device of the provider network comprises, based on an additional connection to be established by the user device, selecting a second network device of a second provider network corresponding to a second subscriber authenticator.

16. The method of claim 10, wherein the subscriber authenticator comprises an electronic subscriber network authenticator for use to connect the user device to network devices respectively corresponding to different provider networks.

17. A machine-readable storage medium, comprising executable instructions that, when executed by a processor of a network device, facilitate performance of operations, comprising:
receiving, from a user device, information corresponding to a group of subscriber authenticators identified by the user device as available to be used for a connection by the user device to a network device of a provider network, of network devices of provider networks corresponding to the group of subscriber authenticators;
identifying information regarding a characteristic of potential connections, by the user device, to the network devices of the provider networks, maintained by network providing entities, wherein identifying the information regarding the characteristic of the potential connections comprises retrieving a current network cost characteristic from an information device maintained by respective provider networks;
based on the information, selecting a subscriber authenticator from the group of subscriber authenticators based on a characteristic of the subscriber authenticator, resulting in a selected subscriber authenticator; and
communicating the selected subscriber authenticator to the user device for use by the user device to establish the connection to the network device of the provider network corresponding to the selected subscriber authenticator.

18. The machine-readable storage medium of claim 17, wherein identifying the information regarding the characteristic further comprises collecting the information by the network device based on measured connection quality metrics.

19. The machine-readable storage medium of claim 17, wherein communicating the selected identifier resource to the user device comprises issuing an instruction to the user device to establish the connection to the network device of the provider network.

20. The machine-readable storage medium of claim 17, wherein identifying the information regarding the characteristic of the potential connections, by the user device, to the network devices of the provider networks comprises receiving the information regarding the characteristic from the user device.

* * * * *